United States Patent [19]

Felippe

[11] Patent Number: 5,187,654

[45] Date of Patent: Feb. 16, 1993

[54] ROTARY PHASE CONVERTER

[76] Inventor: Renato Felippe, Rua Rodrigo Lobato, 102, 05003 São Paulo, Brazil

[21] Appl. No.: 649,512

[22] Filed: Feb. 5, 1991

[30] Foreign Application Priority Data

Jun. 5, 1989 [BR] Brazil .................. 8902584

[51] Int. Cl.$^5$ ............................. H02M 5/06
[52] U.S. Cl. .................. 363/154; 363/153; 363/155
[58] Field of Search ............ 363/153, 154, 155, 150, 363/152

[56] References Cited

U.S. PATENT DOCUMENTS

| | | | |
|---|---|---|---|
| 2,467,863 | 4/1949 | Short | 363/155 |
| 2,480,576 | 8/1949 | Helber | 363/155 |
| 2,526,858 | 10/1950 | Epstein et al. | 363/154 |
| 2,546,021 | 3/1951 | Sonnemann | 363/154 |
| 3,809,980 | 5/1974 | Nottingham | 363/154 |
| 3,866,097 | 2/1975 | Anzai et al. | 318/761 |
| 4,137,488 | 1/1979 | Sibalis | 318/767 |
| 4,249,237 | 2/1981 | Ronk et al. | 363/150 |
| 4,418,309 | 11/1983 | Bartlett | 318/818 |
| 4,719,560 | 1/1988 | Ford | 363/150 |
| 4,901,213 | 2/1990 | Bessho et al. | 363/154 |

Primary Examiner—Jeffrey L. Sterrett
Attorney, Agent, or Firm—Nils H. Ljungman & Associates

[57] ABSTRACT

A rotary phase converter for connection to a single AC power source intended to supply triphase current to a triphase electrical load with minimum current and voltage imbalances. Furthermore, it is not necessary to adjust the equipment as the load changes on the overall range.

The phase converter embodies an induction machine acting as rotary phase-shifter and a compensation circuit containing passive elements only. Another version with additional features for improved efficiency is also shown.

Moreover, because of the current symmetry available, this phase converter can also be connected to a triphase power source to supply a single-phase load.

10 Claims, 6 Drawing Sheets

ROTARY PHASE CONVERTER

CROSS REFERENCE TO RELATED APPLICATIONS

This application is a continuation-in-part application of International Application No. PCT/BR90/00001 filed on Mar. 6, 1990, in which the U.S. was a designated state, which claims priority from Brazilian Patent Application No. 8.902.584 filed on Jun. 5, 1989.

BACKGROUND OF THE INVENTION

This invention relates to electrical apparatus for converting single-phase AC power to triphase AC power and vice-versa.

FIELD OF THE INVENTION

According to technical and economical aspects, the generation, transmission, distribution and use of electrical power are made with three-phase AC. However there are applications, such as in the case of agricultural regions, where the distribution is done with single-phase AC for economical reasons. In these cases, the machine drive would be limited to the use of single-phase motors which show several constraints in comparison with three-phase motors, such as higher initial and maintenance costs.

Moreover, the single phase motor shows operational characteristics inferior to triphase motors. However, the use of three-phase motors in single-phase distribution systems is possible due to the use of phase converters.

There are two basic types of phase converters: the static type, which uses capacitors to create the third phase and the rotary type, which uses an electrical machine similar to a three-phase induction motor. With the static type of phase converter, it is possible to create a current balance in the three phases only for a determined load condition in the three-phase motor. To accomplish an equilibrium in several load conditions, it is necessary to introduce an autotransformer with several taps to be properly chosen as the load changes together with the capacitors. On the other hand, when the rotary phase converter has one of its three phases fed with single-phase AC power, the other two phases show voltages, thus creating a three-phase system through the rotating field appearing in the machine gap. This kind of converter also uses capacitors, although a current balance is never reached for any load condition.

So, the main problem with the phase converters described above is the line voltage and phase current imbalance occurring as the three-phase motor load changes and, in trying to solve the problem, the use of capacitors and/or autotransformers are needed to restore the equilibrium condition unless the operation condition is well defined.

OBJECT OF THE INVENTION

The object of the invention is to provide a phase converter which shows a minimum imbalance for the phase currents without need for compensations as three-phase load changes. As mentioned above in relation to known phase converters, such compensations may require the provision of additional capacitors and/or autotransformers as the three-phase motor load changes. The phase converter of the present invention, as described hereinbelow, substantially eliminates the need for such compensations. Moreover, the phase converter presented herein shows good voltage regulation. The phase converter now described is preferably supported in a biphase induction machine which is preferably connected to a compensation circuit in such a way that, preferably, the final result is an apparatus with intrinsic regulation as the three-phase load changes.

SUMMARY OF THE INVENTION

In summary, one feature of the invention resides broadly in a phase converter for being connected between a single-phase AC power source providing current and a three-phase electrical load, the phase converter being for providing three-phase electrical current to the three-phase electrical load, the phase converter comprising: means for shifting phase of the current from the single-phase power source and generating three-phase power; the phase shifting means comprising means for generating a first phase, a second phase and a third phase; the second phase generating means comprising at least a primary winding and a secondary winding; the primary winding having means for connection to the single-phase power source; the secondary winding being for generating a voltage having a substantial quadrature component in relation to a voltage applied to the primary winding; means for compensating voltage loss across at least one phase of the three-phase current, the compensating means being disposed between the phase shifting means and the three-phase load; the compensating means comprising at least one resistor; and the compensating means comprising means for providing at least one of: inductive compensation at least for compensating voltage loss across the at least one phase; and capacitive compensation at least for compensating voltage loss across the at least one phase.

DESCRIPTION OF THE PREFERRED EMBODIMENT

Figure 1:
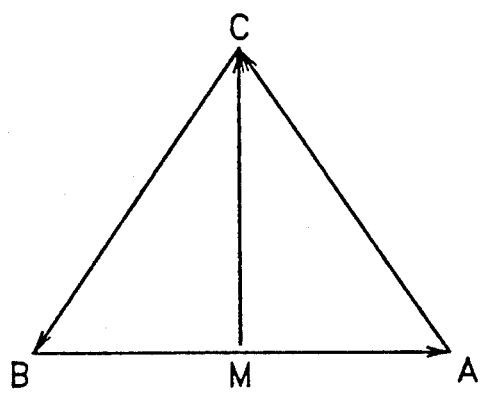
FIG. 1 is a phasor diagram of ideal phase converter voltages.

As can be seen in FIG. 1, it is possible to obtain a triphase AC power system from a biphase AC power system, where the vectors BA, AC and CB represent the triphase line voltages and where point M represents the point in the middle of the points A and B, or the midpoint of vector BA, and it may easily be seen that the vectors BA and MC are the biphase line voltage phasors.

As is known, it may be possible to obtain a biphase system from a monophase system by using an induction machine acting as a rotary transformer, where the secondary voltage winding is substantially shifted 90 electrical degrees with respect to the primary voltage winding. So, it may be just necessary to use such a rotary transformer with a secondary voltage level corresponding to about 86.60% with respect to the primary voltage level in such a way as to substantially generate a biphase system.

Figure 3:
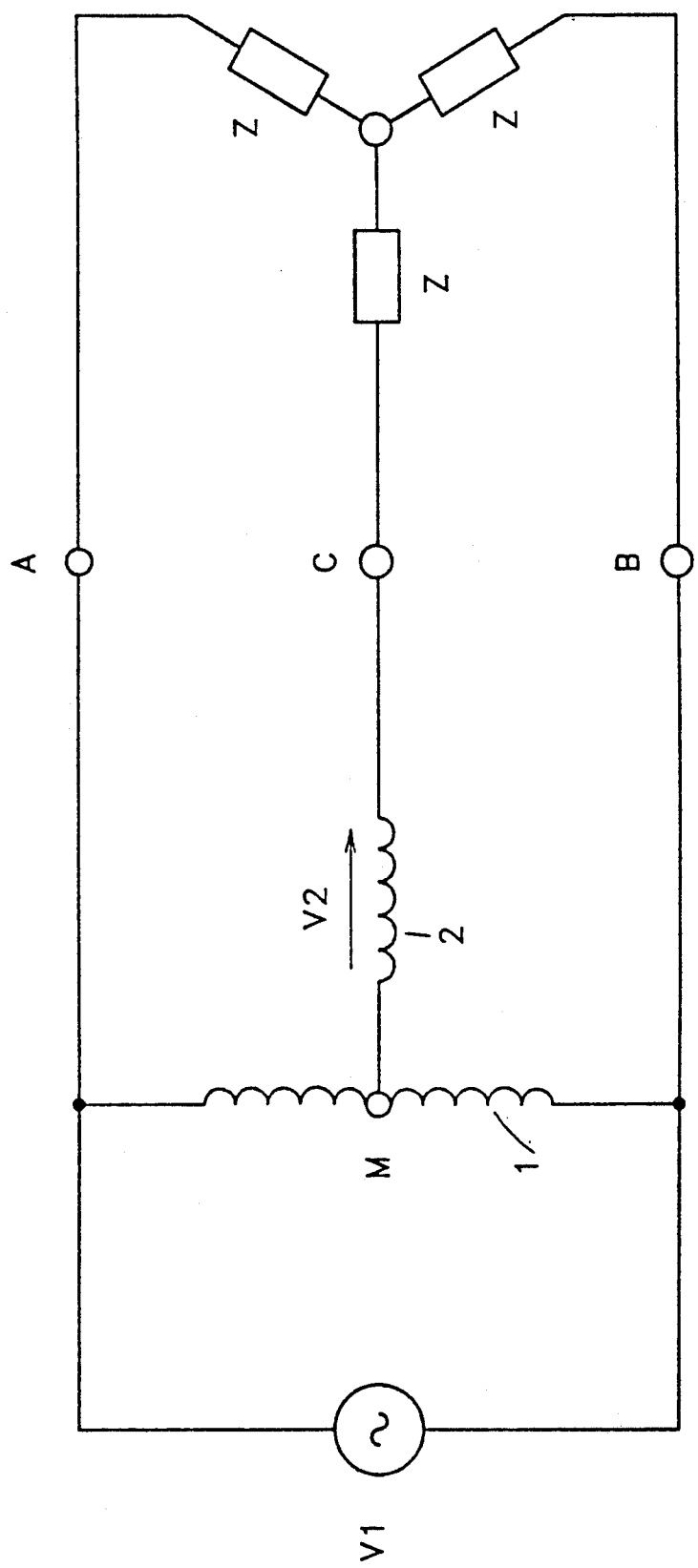
FIG. 3 is a schematic diagram of an ideal phase converter described in the present invention and the respective triphase load impedance.

FIG. 3 shows a schematic diagram of the ideal phase converter connected to a monophase system, where the line voltage module is V1 feeding a wye-connected triphase load where Z is the phase load impedance. The line voltage between phases A and B is the monophase system voltage and the voltage between points C and M is $V2=j\sqrt{3}V1/2$, where j is the complex unit. V2 is substantially obtained through the rotary transformer, which rotary transformer is shown schematically in FIG. 3 as preferably including a primary winding 1 and secondary winding 2. In this way, the voltages V1 and V2 substantially produce a biphase system which in turn substantially produces a triphase system, as can be seen from FIG. 1. It can be shown that the phase currents $I_a$, $I_b$ and $I_c$, or the currents through phases A, B and C, respectively, are substantially symmetrical and balanced with modules $V1/\sqrt{3}Z$ and shifted from each other by about 120 electrical degrees. Shown in FIG. 3 is the phase converter operating as a substantially ideal one, in which, however, the rotary transformer may be a source of losses and shiftings.

Figure 2:
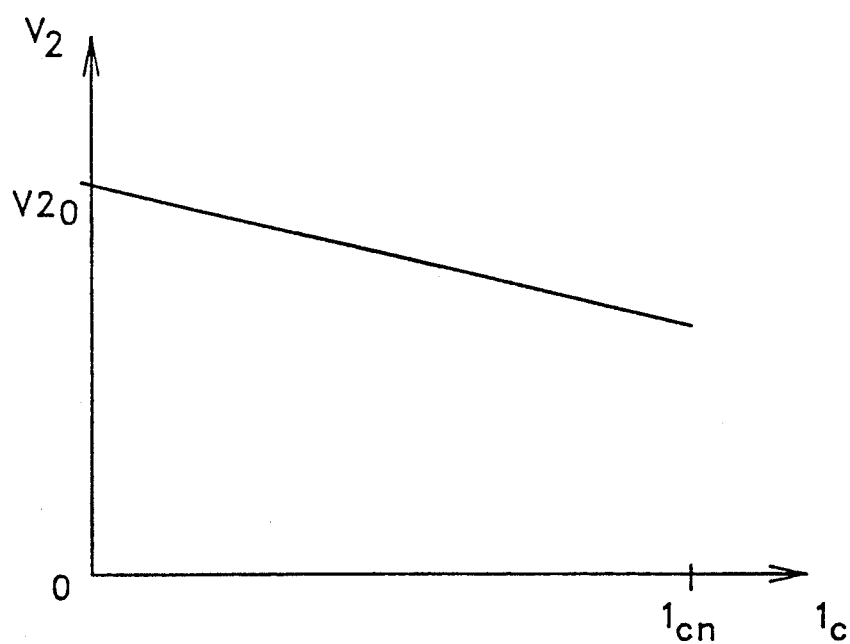
FIG. 2 is a graph showing secondary voltage regulation of an induction machine used in the present invention.

FIG. 2 shows the V2 regulation as a function of the current in phase C where $V2_0$ is the value for V2 when operating at substantially no load. The decrease of V2 may be seen as an impedance $z=r+jx$ in series with the rotary transformer secondary winding, where r and x are the equivalent resistance and reactance, respectively. The impedance z substantially produces an imbalance in the phase converter voltage and current described above. So, it is, therefore, preferable to use a compensation circuit. In FIG. 3, the impedance Z+z is the total impedance substantially present in phase C, so, therefore, the imbalance may be understood as a phase load imbalance. It can be shown that equilibrium may be substantially restored using an additional impedance z in each of the phases A and B. Such a compensation circuit for providing an additional impedance z in each of the phases A and B may include resistors, capacitors, reactors or other types of circuit components in various series and parallel configurations among phases A, B and C.

It may be, consequently, necessary to add a resistance r in each of the phases A and B. Thus, the reactive compensation can be substantially accomplished in at least the following two ways: by using an inductive reactance jx in series with phases A and B or through the use of a capacitive reactance −jx in series with phase C. Other possibilities for reactive compensation, using resistors, capacitors, reactors, or other types of circuit components in other various series and parallel configurations, may be used among phases A, B and C in a compensation circuit in the embodiments of the present invention.

Figure 4:
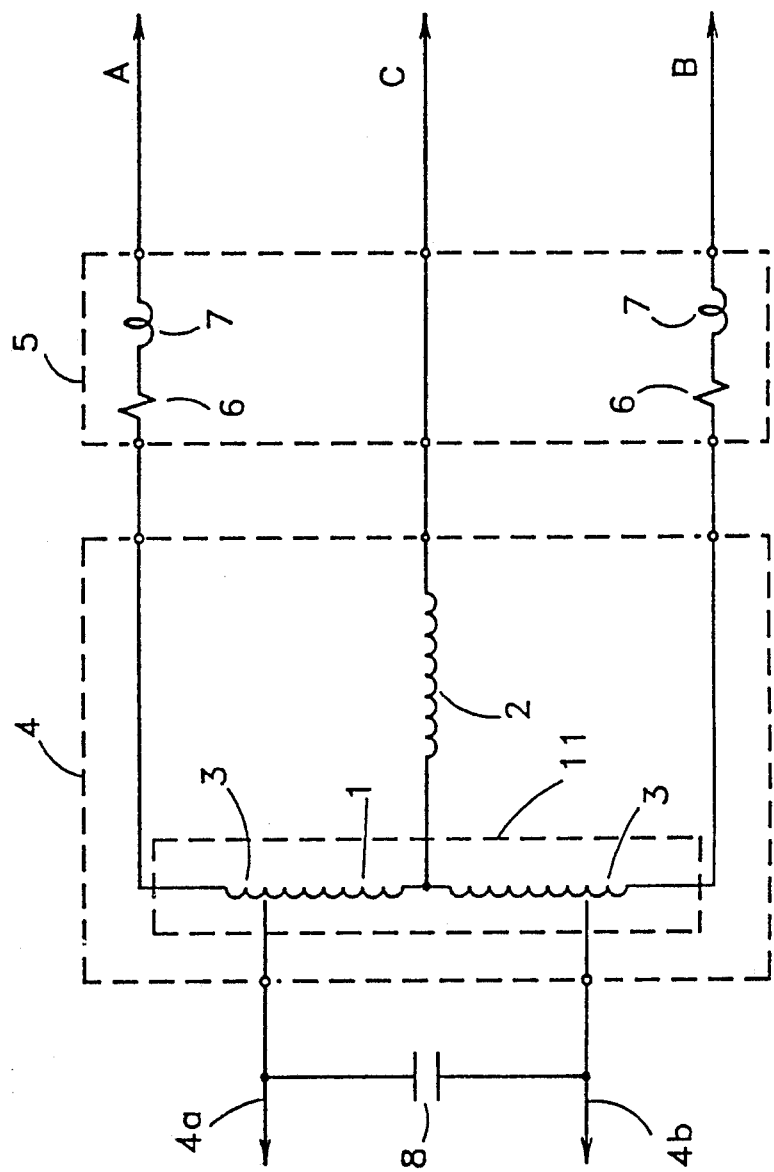
FIG. 4 is a schematic diagram of the phase converter with an inductive compensation circuit.
Figure 5:
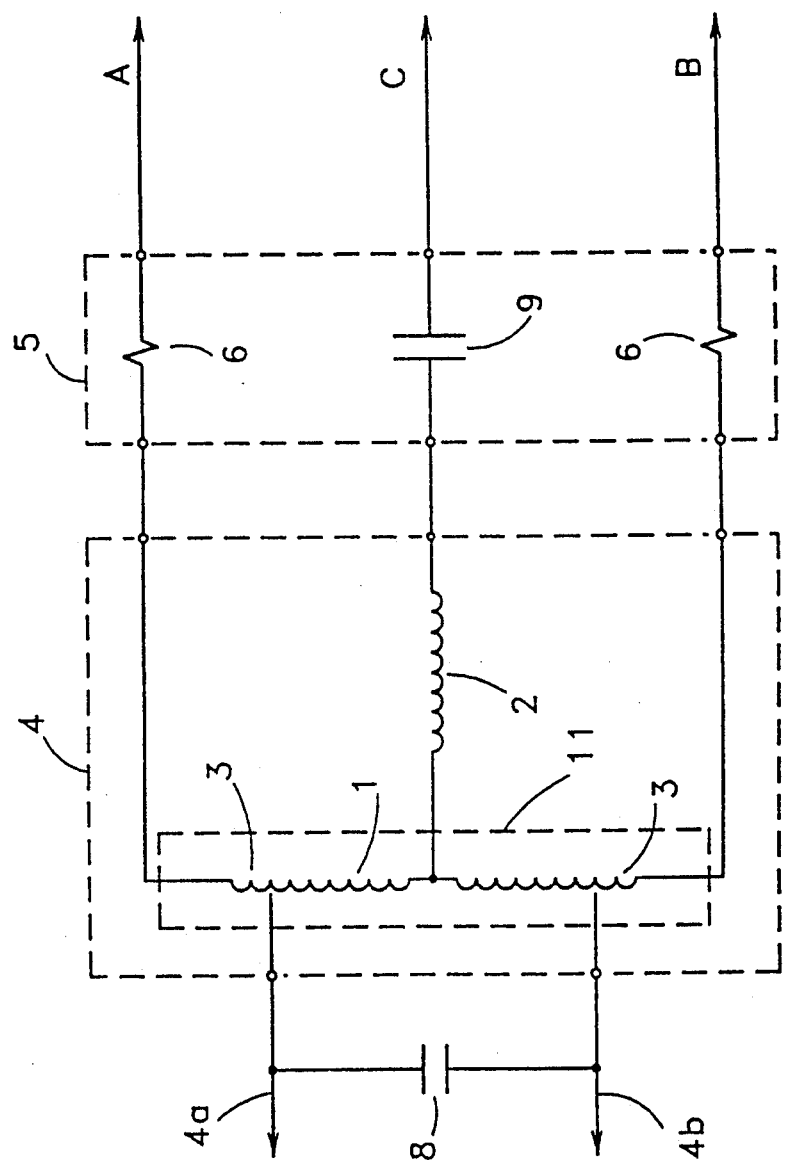
FIG. 5 is a schematic diagram of the phase converter with a capacitive compensation circuit.

FIGS. 4 and 5 show schematic diagrams of the phase converter using compensation circuits based on inductive and capacitive reactances, respectively. In using the compensation circuits as shown, it may be possible to obtain a substantially symmetrical and balanced triphase system showing, over the entire load range, substantially good voltage regulation and a substantially very small current imbalance.

But, even as a small voltage decrease appears, it may be necessary to adjust the input voltage to the phase converter. Such adjustment may be done by making the phase converter primary winding preferably act as an internal autotransformer, which in turn may also be used to preferably increase or decrease the phase converter output voltage, so that, preferably, the input and output voltages of the phase converter may be independent. The use of a resistance in series with each of the phases A and B may slightly decrease the efficiency of the phase converter. However, it may be possible to use other schemes where the compensation circuit losses may decrease by about 50%; examples of such circuits may be seen in FIGS. 6 and 7.

It is preferable to use an autotransformer in such a way as to substantially create a path for phase C current. It may be shown that the phase current modules, in this case, are $V1/\sqrt{3}(2z/3+Z)$. The value of the resistor may decrease by about 33.33% and, also, the resistor substantially operates only with the current from the monophase system which flows between phases A and B, which current may be about 13.40% less than the triphase current modules.

According to FIGS. 4 and 5, the phase converter is preferably embodied mainly by a rotary transformer 4, shown inside a dashed line. The rotary transformer 4, substantially fed by a monophase AC power source, is, for the purpose of this description, preferably embodied by a primary winding 1 and a secondary winding 2, such that an additional winding 3 together with primary winding 1 preferably form part of an autotransformer 11 which preferably adapts the phase converter output voltage level to the monophase voltage level available. The autotransformer 11 may also be used to substantially compensate the small voltage decrease caused by the compensation circuit. Leads 4a and 4b from the single phase power source preferably connect with the rotary transformer at either end of the primary winding 1. Furthermore, primary winding 1 and additional winding 3 are preferably wound about a common core.

The number of turns of the secondary winding 2 and of the internal autotransformer windings 1 and 3 preferably have a relationship which produces a relation between their voltages equal to about $\sqrt{3}/2$ when the phase converter is operating at substantially no load. Furthermore, one lead of the secondary winding 2 is preferably connected to the primary winding 1 through a center tap, such that the other lead of the secondary winding 2 substantially serves as the output for the phase that is being created.

It should be understood that windings 1, 2 and 3 may not necessarily be limited to inductive windings, but may be impedances which include capacitive or other elements to assist in the shifting of phase. For example, with capacitive elements preferably connected in series with winding 1, the phase shift of current will substantially lead the voltage impressed across winding 1, thereby substantially producing a voltage across winding 2, such that the voltage across winding 2 will be substantially 90° out of phase with the voltage across winding 1. Other types of circuit components may also be used with windings 1, 2 and 3 to substantially result in the shifting of phase.

In FIG. 4, the other element of the phase converter, the compensation circuit 5, contains a resistor 6 and a reactor 7 (such as an induction coil), such that, in this case, both the resistor 6 and reactor 7 are preferably connected in series with the phases A and B so as to feed the triphase load.

In FIG. 5, on the other hand, the compensation circuit 5 contains the resistor 6 connected in series with phases A and B and a capacitor 9 connected in series with phase C. In both cases, for FIGS. 4 and 5, another capacitor 8 may be disposed such that the leads therefrom preferably connect to each of the power source leads 4a and 4b. Preferably, the only purpose of the capacitor 8 in each case is to furnish reactive current needed for the magnetic circuit of the rotary transformer.

It should be appreciated that, in the embodiments of FIGS. 4 and 5, the values of the resistors 6, reactors 7 and capacitors 9 are preferably chosen such that any current or voltage imbalances among phases A, B and C are substantially eliminated, and also such that substantially no such imbalances arise when the monophase current load changes.

Figure 6:
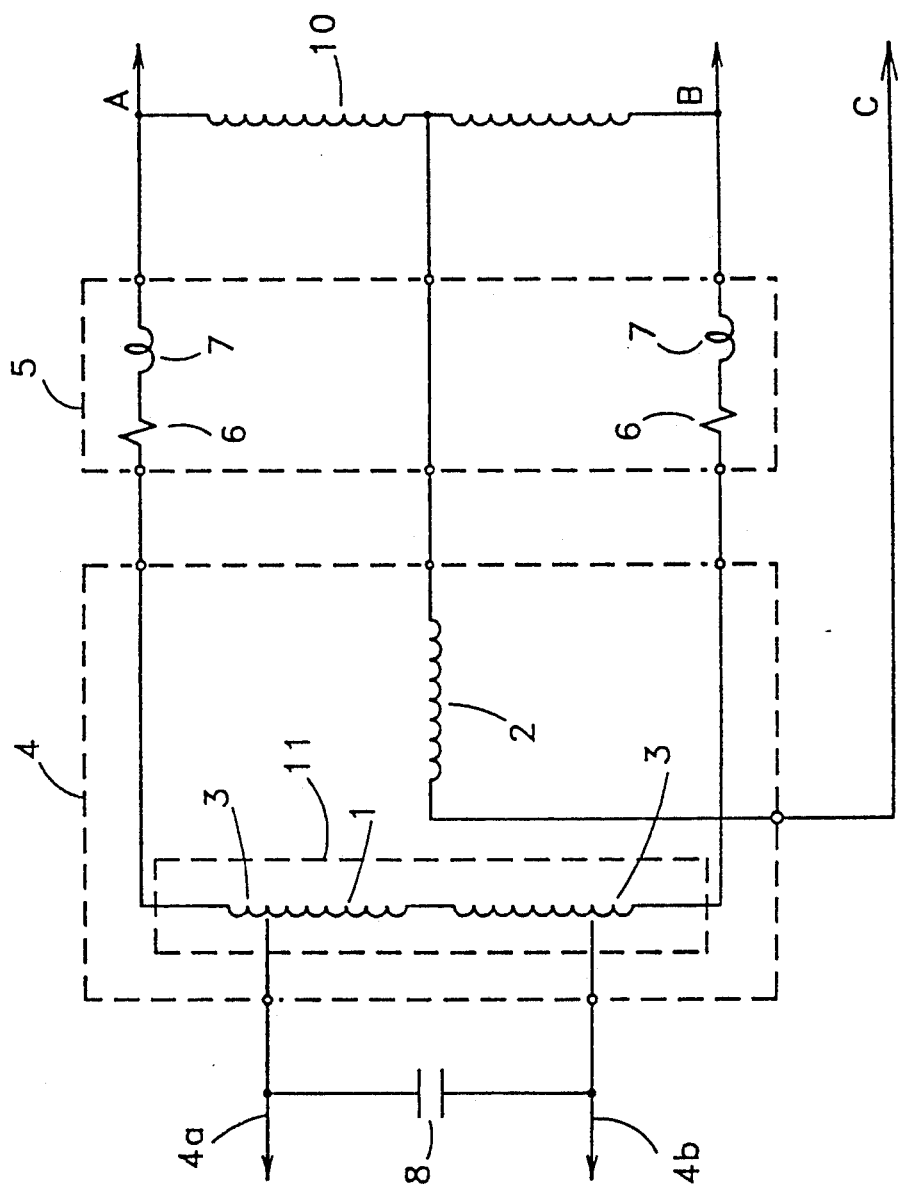
FIG. 6 is a schematic diagram of the phase converter with an inductive compensation circuit substantially providing better phase converter efficiency.
Figure 7:
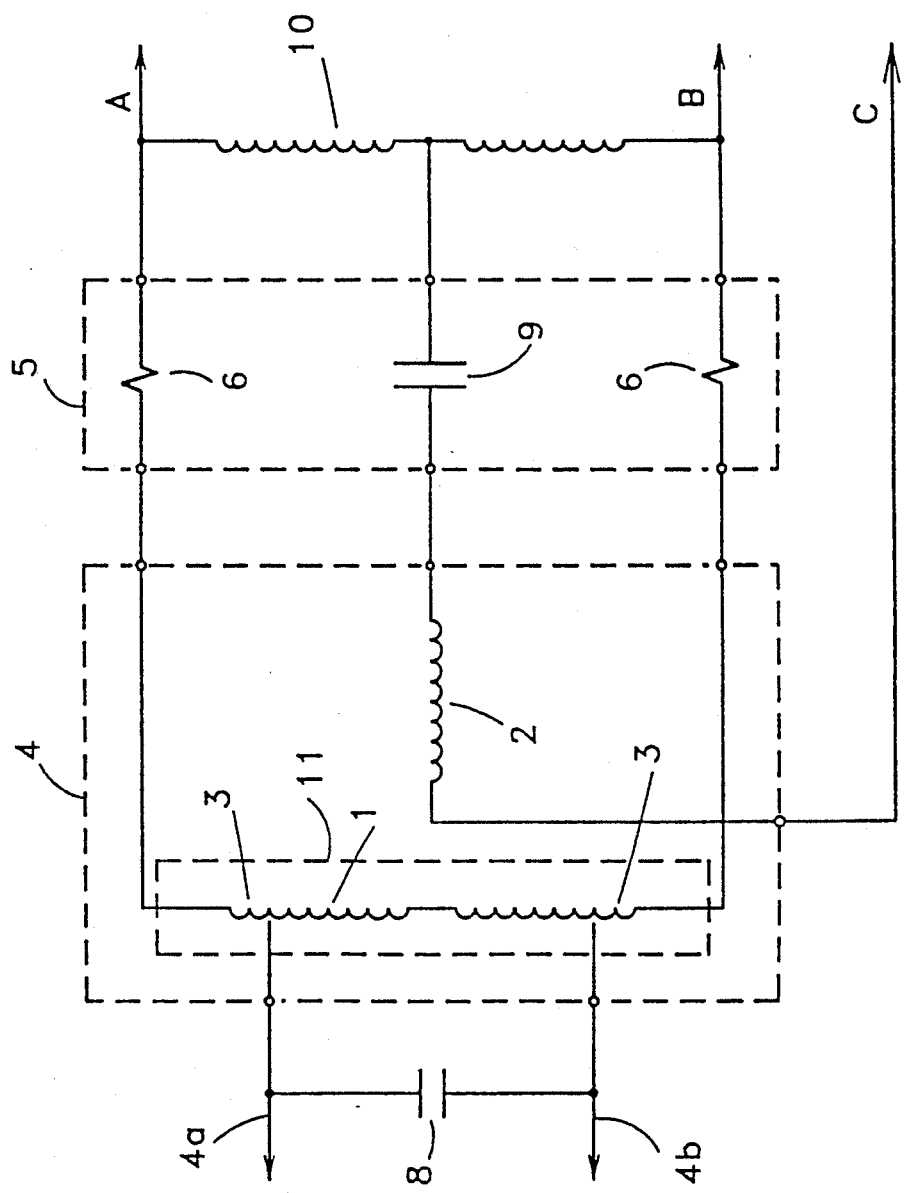
FIG. 7 is a schematic diagram of the phase converter with a capacitive compensation circuit substantially providing better phase converter efficiency.

Now, according to the embodiments of FIGS. 6 and 7, it is possible to obtain a phase converter with increased efficiency in comparison with the embodiments shown in FIGS. 4 and 5. In this case, it is preferable to add an autotransformer 10 with a center tap connected to the rotary transformer secondary winding 2, such that the compensation circuit 5 is preferably disposed between and connected to the rotary transformer 4 and the autotransformer 10.

It should be understood that the autotransformer 10 may not necessarily be limited to an inductive winding, but may be an impedance which includes capacitive or other elements to assist in the shifting of phase. For example, with capacitive elements preferably connected in series with autotransformer 10, the phase shift of current will substantially lead the voltage impressed across autotransformer 10, thereby substantially producing a voltage across winding 2, such that the voltage across winding 2 will be substantially 90° out of phase with the voltage across autotransformer 10. Other types of circuit components may also be used with winding 2 and autotransformer 10 to substantially result in the shifting of phase.

In FIG. 6, the compensation is substantially inductive and is accomplished through the use of the resistor 6 and the reactor 7, both set in, and therefore disposed in series with phases A and B. In FIG. 7, the compensation is substantially capacitive through the use of resistor 6 in phases A and B and additionally through the use of capacitor 9 in phase C. In the embodiments of FIGS. 6 and 7, as in the embodiments of FIGS. 4 and 5, capacitor 8 may be disposed such that the leads therefrom preferably connect at each of the power source leads 4a and 4b. Preferably, as mentioned above, the only purpose of the capacitor 8 shown therein is to furnish reactive current needed for the magnetic circuit of the rotary transformer.

In the embodiments of FIGS. 6 and 7, just as in the embodiments of FIGS. 4 and 5, the values of the resistors 6, reactors 7, capacitors 9 and any other circuit components which may be used with the present invention, are preferably chosen such that any current or voltage imbalances among phases A, B and C are substantially eliminated, and also such that substantially no such imbalances arise when the monophase current load changes. Additionally, various aspects of the autotransformer 10, such as the number of turns, are also preferably chosen to help substantially eliminate any current or voltage imbalances among phases A, B and C and, especially, to preferably provide a more efficient configuration such that compensation circuit losses may decrease by about 50%.

Table 1 shows the results from a phase converter prototype intended to feed a 1.5 HP-220 V three-phase induction motor. The results were obtained using a three-phase synchronous motor in such a way as to see the behavior of the voltage regulation using the power factor as a parameter. As can be seen from Table 1, the phase current imbalances are less than 5% and the line voltage imbalances are less than 2% over the entire load range, wherein the percent imabalance is calculated as (maximum/average)/average. The phase converter type used was that shown in FIG. 4.

TABLE 1

1.5 HP - 220 V Phase Converter - Inductive Compensation
Performance Tests - Line Voltage: 230 V

| Power Factor cos φ | Line Cur. (A) Il | Phase Current (A) | | | Load Voltage (V) | | |
|---|---|---|---|---|---|---|---|
| | | $I_a$ | $I_b$ | $I_c$ | $V_{ab}$ | $V_{bc}$ | $V_{ca}$ |
| 1.0 | 1.0 | — | — | — | 237 | 231 | 229 |
| | 3.8 | 1.4 | 1.6 | 1.5 | 226 | 225 | 221 |
| | 4.6 | 2.0 | 2.1 | 2.0 | 223 | 222 | 218 |
| | 5.6 | 2.5 | 2.6 | 2.5 | 220 | 219 | 215 |
| | 6.6 | 3.0 | 3.1 | 3.0 | 219 | 217 | 214 |
| | 7.6 | 3.5 | 3.6 | 3.5 | 215 | 212 | 212 |
| | 8.6 | 4.0 | 4.1 | 4.0 | 211 | 208 | 209 |
| | 9.6 | 4.5 | 4.6 | 4.5 | 207 | 205 | 203 |
| | 10.6 | 5.0 | 5.1 | 5.0 | 203 | 200 | 202 |
| 0.9 | 3.5 | 1.4 | 1.6 | 1.4 | 224 | 222 | 220 |
| | 4.6 | 2.0 | 2.1 | 1.9 | 219 | 217 | 215 |
| | 5.6 | 2.5 | 2.6 | 2.3 | 214 | 211 | 209 |
| | 6.8 | 3.2 | 3.2 | 3.0 | 207 | 204 | 202 |
| | 7.8 | 3.6 | 3.6 | 3.4 | 200 | 198 | 196 |
| 0.8 | 3.2 | 1.1 | 1.3 | 1.0 | 224 | 221 | 219 |
| | 3.8 | 1.5 | 1.8 | 1.4 | 220 | 217 | 215 |
| | 4.6 | 2.0 | 2.1 | 1.8 | 215 | 212 | 210 |
| | 5.5 | 2.4 | 2.5 | 2.4 | 211 | 209 | 206 |
| | 6.8 | 3.1 | 3.2 | 3.0 | 202 | 201 | 198 |
| | 7.7 | 3.6 | 3.7 | 3.5 | 196 | 195 | 192 |
| 0.7 | 3.2 | 1.2 | 1.3 | 1.1 | 222 | 220 | 218 |
| | 4.0 | 1.5 | 1.6 | 1.4 | 219 | 218 | 214 |
| | 4.8 | 2.1 | 2.2 | 1.9 | 212 | 209 | 207 |
| | 5.6 | 2.5 | 2.6 | 2.4 | 208 | 207 | 204 |
| | 6.7 | 3.1 | 3.1 | 3.0 | 202 | 200 | 198 |
| | 7.7 | 3.7 | 3.7 | 3.5 | 198 | 194 | 191 |
| | 8.6 | 4.1 | 4.1 | 3.9 | 190 | 189 | 186 |

The features shown in FIGS. 4, 5, 6 and 7 may also be used for conversion from a triphase system to a monophase system, whereby the leads corresponding to phases A, B and C would preferably be fed with triphase AC power to preferably obtain monophase AC power in the other side of the phase converter.

As various changes could be made in the above constructions without departing from the scope of the invention, it is intended that all matter contained in the above description or shown in the accompanying drawings shall be interpreted as illustrative, rather than as delimiting.

One aspect of the invention resides broadly in a phase converter for connection to a single-phase AC power source and adapted to supply triphase current to a triphase electrical load or vice-versa, said converter comprising: a biphase induction machine acting as a rotary phase shifter 4 having at least a primary winding 1 and a secondary winding 2 which produces a voltage shift of 90 electrical degrees when compared to the primary winding voltage, and said primary winding to be connected to a single-phase AC power source; a compensation circuit 5 connected between the rotary phase-shifter and the triphase load, said compensation circuit having at least a resistor 6 and be accomplished in two possible ways: with an inductive compensation and with a capacitive compensation; an autotransformer 10 with a center tap used in phase converters intended to have increased efficiency and set between the compensation circuit and the load, and; a capacitor 8 connected in parallel to the phase converter primary winding.

Another aspect of the invention resides broadly in the phase converter wherein the rotary phase-shifter primary winding can also contain another winding part 3 to act together with the primary winding 1 as an internal autotransformer 11.

Yet another aspect of the invention resides broadly in the phase converter wherein the rotary phase-shifter secondary winding voltage has a relation to the internal autotransformer winding voltage of 86.60% when operating at no load.

A further aspect of the invention resides broadly in the phase converter wherein the compensation circuit 5 is accomplished with two resistors 6 each one connected between the phases derived from the single-phase AC power source and two of the triphase load phases and with two reactors 7, said reactors connected in series with the resistors described above. Being the rotary phase-shifter secondary winding connected between the remaining triphase load phase and the center tap of the primary winding 1.

A yet further aspect of the invention resides broadly in the phase converter wherein the compensation circuit 5 is also accomplished through the use of a capacitor 9 in series with the rotary phase-shifter secondary winding 2 both connected between the triphase load and the center tap of the primary winding as well as the two resistors 6 each on the other two phases between the single-phase line and the load.

Yet another further aspect of the invention resides broadly in the phase converter where is possible to use an autotransformer 10 between the compensation circuit 5 and the load, said autotransformer connected to two phases derived from the single-phase AC power source but after the resistor 6 and the reactor 7 is the inductive compensation alternative and after the resistor 6 only in the capacitive compensation alternative whereas the autotransformer center tap is connected to the rotary phase-shifter secondary winding which in turn is connected directly to the triphasic load in the inductive compensation alternative but through a capacitor 9 in series in the capacitive compensation alternative.

An additional aspect of the invention resides broadly in the phase converter which can also be used to supply a single-phase AC load from a triphase AC power source being enough to accomplish such a thing to replace the triphase load by a triphase power source and the single-phase power source by a single-phase load.

Examples of internal components, such as phases shifters, autotransformers, winding configurations, and circuit components, which may be utilized in the embodiments of the present invention, may be found in the following U.S. Pat. Nos.: 4,719,560, entitled "Rotary Phase Generator and System", issued Jan. 12, 1988; 4,249,237, "Rotary Phase Converter", Feb. 3, 1981; 4,418,309, "Two Phase Induction Motor Circuit with Series Connected Center-tapped Stator Windings", Nov. 29, 1983; 3,866,097, "Control Apparatus for Induction Motor", Feb. 11, 1975; and 4,137,488, "Modified Induction Motor for Use in a Three Phase Power System", Jan. 30, 1979.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A phase converter for being connected to a single-phase AC power source and being adaptable for supplying at least one of: triphase current to a triphase electrical load and monophase current to a monophase electrical load, said phase converter comprising:
    a biphase induction machine;
    said biphase induction machine being configured to act as a rotary phase-shifter;
    said biphase induction machine comprising:
        a primary winding and a secondary winding;
        said secondary winding for producing a voltage shift of 90 electrical degrees;
        said primary winding for being connected to the single-phase AC power source;
    a compensation circuit being connected between said rotary phase-shifter and the triphase electrical load, said compensation circuit comprising:
        a resistor; and
        means for providing at least one of:
            inductive compensation; and
            capacitive compensation;
    an autotransformer for providing increased efficiency for the phase converter;
    said autotransformer having a center tap;
    said autotransformer being disposed between said compensation circuit and the triphase load; and
    a capacitor being connected in parallel with said primary winding.

2. The phase converter according to claim 1, further comprising:
    said primary winding comprising another winding element;
    said primary winding and said another winding element for acting together as an internal autotransformer.

3. The phase converter according to claim 1, wherein, when the phase converter is operating at no load, the ratio of the voltage of the secondary winding to the voltage of the internal autotransformer is 86.60%.

4. The phase converter according to claim 1, further comprising:
    said compensation circuit comprising two resistors;
    each of said two resistors being connected in the phases derived from the single-phase AC power source;
    said compensation circuit further comprising two reactors;

each of said two reactors being connected in series with a corresponding one of said two resistors; and said secondary winding being connected between the phase of the triphase load other than the phases derived from the single-phase AC power source and said center tap of said autotransformer.

5. The phase converter according to claim 1, further comprising:
said compensation circuit comprising a capacitor being disposed in series with said secondary winding;
each of said capacitor and said secondary winding being connected between the triphase load and said center tap of said autotransformer;
said capacitor and said secondary winding being disposed in one phase between said single-phase AC power source and said triphase load; and
two resistors each being disposed in one of the other two phases between said single-phase AC power source and said triphase load.

6. The phase converter according to claim 1, further comprising:
an autotransformer being disposed between said compensation circuit and said triphase load;
said autotransformer being connected to two phases derived from the single-phase AC power source;
said autotransformer being connected between said reactors and said triphase load; and
said center tap of said autotransformer being connected directly to said triphase load.

7. The phase converter according to claim 1, further comprising:
an autotransformer being disposed between said compensation circuit and said triphase load;
said autotransformer being connected to two phases derived from the single-phase AC power source;
said autotransformer being connected between said resistors and said triphase load; and
said center tap of said autotransformer being connected to said triphase load via a capacitor, said capacitor being disposed in series with said center tap of said autotransformer.

8. The phase converter according to claim 1, wherein, for adapting the phase converter to supply a single-phase current to a single-phase electrical load, said triphase load is replaceable by a triphase power source and said single-phase AC power source is replaceable by a single-phase load.

9. A phase converter for being connected between a single-phase AC power source providing single-phase current and a three-phase electrical load, said phase converter being for providing three-phase electrical current to the three-phase electrical load, said phase converter comprising:
means for phase shifting of the current from the single-phase power source and generating three-phase power;
said phase shifting means being a rotary phase shifter;
said phase shifting means comprising means for generating a first phase, means for generating a second phase and means for generating a third phase;
said second phase generating means comprising a primary winding and a secondary winding;
the single-phase power source having two leads extending therefrom for being connected to said phase converter;
said primary winding having two ends, each of said two ends for being connected to each said lead of the single-phase power source;
said secondary winding being for generating a voltage having a voltage shift of substantially 90° in relation to a voltage applied to said primary winding;
means for compensating at least one of current imbalance and voltage loss across at least one phase of the three-phase current, said compensating means being disposed between said phase shifting means and the three-phase load;
said compensating means comprising a singular resistor in each of said first and third phases;
said second phase generating means comprising a supplementary winding;
said primary winding and said supplementary winding being configured to form at least part of an internal autotransformer;
said primary winding and said supplementary winding being disposed about a common core;
said first phase extending from a first end of said internal autotransformer;
said third phase extending from a second end of said internal autotransformer;
a capacitor for providing said phase shifting means with reactive current;
said capacitor for being connected between said two leads of the single-phase power source, in parallel with said internal autotransformer;
the ratio of the voltage of said secondary winding to the voltage of said internal autotransformer being about 87% when substantially no load is present in said phase converter;
said compensating means comprising a singular resistor in each of said first and third phases;
said single-phase AC power source having two leads extending therefrom for providing the single-phase current;
each of said leads for being connected to said internal autotransformer at each of said two ends of said primary winding;
means for reducing circuit losses in said compensating means;
said circuit loss reducing means comprising an autotransformer for being connected between said compensating means and the three-phase load;
said autotransformer having terminals at each of said first and third phases;
said autotransformer having a center tap;
said autotransformer having a length;
said center tap being disposed at about a midpoint of the length of said autotransformer;
said second phase extending from said center tap of said autotransformer;
said secondary winding being disposed in said second phase between said autotransformer and said three-phase load; and
said compensating means comprising:
a singular capacitor in said second phase; and
said singular capacitor being connected in series with said secondary winding, between said center tap of said autotransformer and said secondary winding.

10. A phase converter for being connected between a single-phase AC power source providing single-phase current and a three-phase electrical load, said phase converter being for providing three-phase electrical current to the three-phase electrical load, said phase converter comprising:

means for phase shifting of the current from the single-phase power source and generating three-phase power;

said phase shifting means being a rotary phase shifter;

said phase shifting means comprising means for generating a first phase, means for generating a second phase and means for generating a third phase;

said second phase generating means comprising a primary winding and a secondary winding;

the single-phase power source having two leads extending therefrom for being connected to said phase converter;

said primary winding having two ends, each of said two ends for being connected to each said lead of the single-phase power source;

said secondary winding being for generating a voltage having a voltage shift of substantially 90° in relation to a voltage applied to said primary winding;

means for compensating at least one of current imbalance and voltage loss across at least one phase of the three-phase current, said compensating means being disposed between said phase shifting means and the three-phase load;

said compensating means comprising a singular resistor in each of said first and third phases;

said second phase generating means comprising a supplementary winding;

said primary winding and said supplementary winding being configured to form at least part of an internal autotransformer;

said primary winding and said supplementary winding being disposed about a common core;

said first phase extending from a first end of said internal autotransformer;

said third phase extending from a second end of said internal autotransformer;

a capacitor for providing said phase shifting means with reactive current;

said capacitor for being connected between said two leads of the single-phase power source, in parallel with said internal autotransformer;

the ratio of the voltage of said secondary winding to the voltage of said internal autotransformer being about 87% when substantially no load is present in said phase converter;

said compensating means comprising a singular resistor in each of said first and third phases;

said single-phase AC power source having two leads extending therefrom for providing the single-phase current;

each of said leads for being connected to said internal autotransformer at each of said two ends of said primary winding;

means for reducing circuit losses in said compensating means;

said circuit loss reducing means comprising an autotransformer for being connected between said compensating means and the three-phase load;

said autotransformer having terminals at each of said first and third phases;

said autotransformer having a center tap;

said autotransformer having a length;

said center tap being disposed at about a midpoint of the length of said autotransformer;

said second phase extending from said center tap of said autotransformer;

said secondary winding being disposed in said second phase between said autotransformer and said three-phase load; and said compensating means comprising:
a singular reactor in each of said first and third phases; and
each of said reactors being connected in series with one said resistor between said resistor and said autotransformer.

* * * * *